United States Patent
Hope et al.

(10) Patent No.: US 8,826,177 B2
(45) Date of Patent: Sep. 2, 2014

(54) MULTIPLE USER PROFILES IN PORTABLE APPARATUS

(75) Inventors: Sirpa Hope, Weisendorf (DE); Jeff Collins, Albuquerque, NM (US)

(73) Assignee: Polar Electro Oy, Kempele (FI)

( * ) Notice: Subject to any disclaimer, the term of this patent is extended or adjusted under 35 U.S.C. 154(b) by 670 days.

(21) Appl. No.: 12/913,355

(22) Filed: Oct. 27, 2010

(65) Prior Publication Data

US 2011/0154258 A1   Jun. 23, 2011

(30) Foreign Application Priority Data

Nov. 10, 2009  (FI) .................................. 20096168

(51) Int. Cl.
G06F 3/048 (2013.01)
G06F 9/445 (2006.01)
H04L 29/08 (2006.01)

(52) U.S. Cl.
CPC .......... G06F 9/44505 (2013.01); H04L 67/125 (2013.01)
USPC ....................................................... 715/810

(58) Field of Classification Search
USPC ......... 715/745, 748, 764, 789, 810, 811, 812, 715/863–866; 600/508–509, 520
See application file for complete search history.

(56) References Cited

U.S. PATENT DOCUMENTS

| | | |
|---|---|---|
| 4,625,733 A | 12/1986 | Saynajakangas |
| 2003/0028116 A1* | 2/2003 | Birnbaum .................... 600/500 |
| 2007/0117074 A1 | 5/2007 | Maurides et al. |
| 2009/0007596 A1* | 1/2009 | Goldstein et al. ............. 63/1.11 |
| 2009/0054209 A1* | 2/2009 | Takeishi et al. .................. 482/8 |
| 2009/0105548 A1 | 4/2009 | Bart |

FOREIGN PATENT DOCUMENTS

| | | |
|---|---|---|
| EP | 0912029 A2 | 4/1999 |
| KR | 1020070041040 A | 4/2007 |
| WO | WO0219667 A2 | 3/2002 |

OTHER PUBLICATIONS

Tuomo Reiniaho, Finnish Search Report for corresponding Finnish Application No. 20096168, p. 1, Jun. 23, 2010.
Koen Bijn, European Search Report for corresponding European Patent Application EP10189914, Feb. 18, 2011.

* cited by examiner

Primary Examiner — Enrique Iturralde
(74) Attorney, Agent, or Firm — Hoffmann & Baron, LLP (57) ABSTRACT

Management of multiple user profiles in a portable apparatus is disclosed. A method includes storing user profiles of a group in a portable apparatus, wherein each user profile specifies user-specific parameters; performing performs a selection of a user profile from among the user profiles of the group stored in the portable apparatus on the basis of a predetermined condition; and modifying modifies an exercise data processing configuration of the portable apparatus on the basis of the selected user profile.

20 Claims, 3 Drawing Sheets

MULTIPLE USER PROFILES IN PORTABLE APPARATUS

CROSS-REFERENCE TO RELATED APPLICATION

This application claims priority based on Finnish Patent Application No. 20096168, filed on Nov. 10, 2009, which is incorporated herein by reference.

BACKGROUND

1. Field

The invention relates to management of multiple user profiles in a portable apparatus.

2. Description of the Related Art

Ease of use of portable apparatuses varies. Basic operations may be easy to use, but more complicated operations may be relatively hard to use, at least for novice users. If one single portable apparatus is used by several different persons, the management of various user profiles may be laborious.

SUMMARY

The present invention seeks to provide an improved portable apparatus, an improved method, an improved computer program, and an improved management apparatus.

According to an aspect of the present invention, there is provided a portable apparatus as specified in claim 1.

According to another aspect of the present invention, there is provided a method as specified in claim 9.

According to another aspect of the present invention, there is provided a computer program as specified in claim 17.

According to another aspect of the present invention, there is provided a computer-readable storage medium as specified in claim 18.

According to another aspect of the present invention, there is provided another portable apparatus as specified in claim 19.

According to another aspect of the present invention, there is provided a management apparatus as specified in claim 20.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

It should be noted that while FIGS. 1, 2, 3, 5, and 6 illustrate various embodiments of a management apparatus 100 and a portable apparatus 102, they are simplified block diagrams that only show some elements and functional entities, all being logical units whose implementation may differ from what is shown. The connections shown in these figures are logical connections; the actual physical connections may be different. Interfaces between the various elements may be implemented with suitable interface technologies, such as a message interface, a method interface, a sub-routine call interface, a block interface, or any means enabling communication between functional sub-units. It is apparent to a person skilled in the art that the described apparatuses 100, 102 may also comprise other functions and structures. It should be appreciated that details of some functions, structures, and elements, and the protocols used for communication are irrelevant to the actual invention. Therefore, they need not be discussed in more detail here. The implementation and features of apparatuses 100, 102 develop rapidly. Such development may require extra changes to an embodiment. Therefore, all words and expressions should be interpreted broadly and they are intended to illustrate, not to restrict, the embodiments. Although the apparatuses 100, 102 have been depicted as separate single entities, different parts may be implemented in one or more physical or logical entities.

Figure 1:
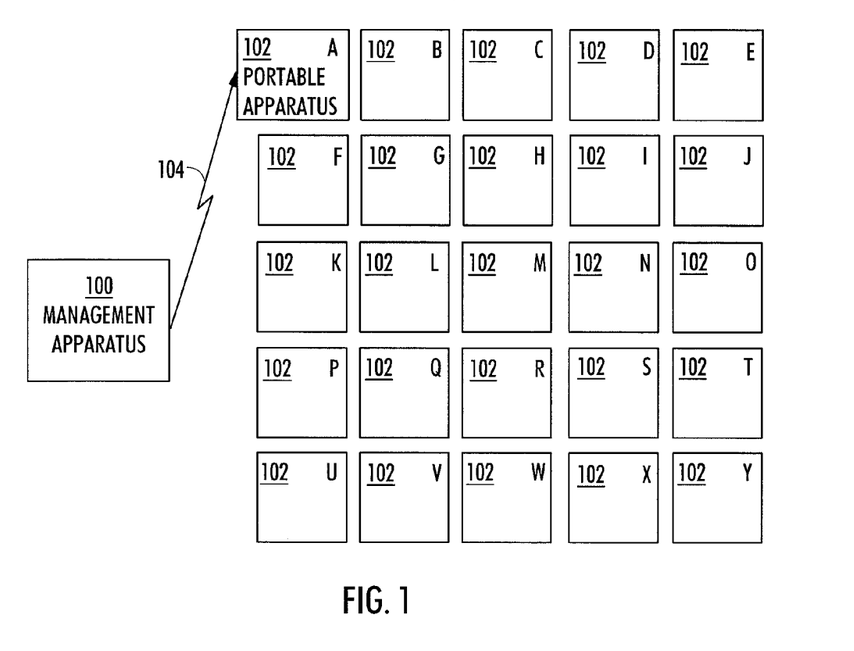
FIG. 1 illustrates portable apparatuses and a management apparatus.

FIG. 1 illustrates the basic concepts: a management apparatus 100, and at least one portable apparatus 102. In the example of FIG. 1 there are twenty-five portable apparatuses 102 denoted with letters A to Y, but the number of the apparatuses 102 may vary according to the usage scenario. The apparatuses 102 A-Y may be used by a group of people. Such a group may be a corporate wellness group, a school class, a student group, or a military group, for example. Each single apparatus 102 A-Y may be used by several persons, each person belonging to a different group. User-specific settings are required in each portable apparatus 102 A-Y.

Figure 3:
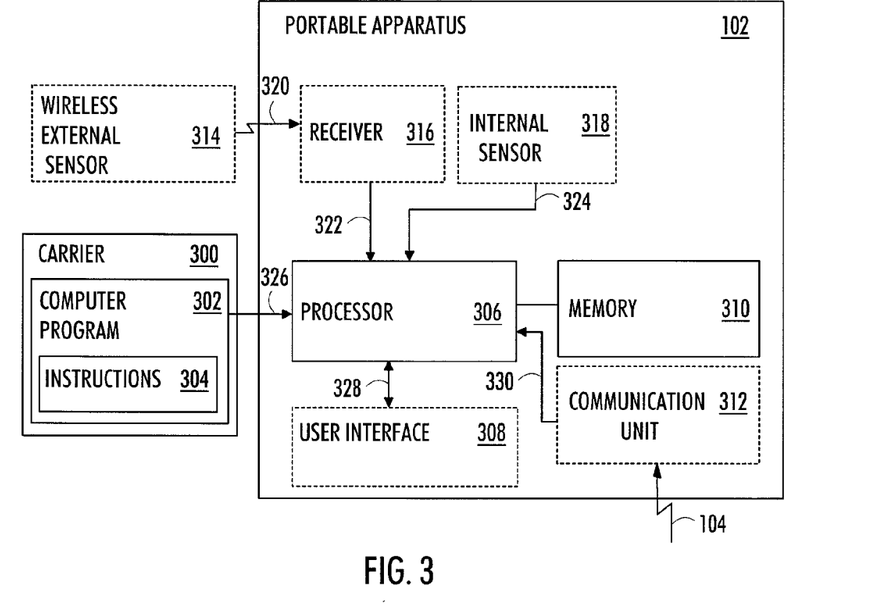
FIGS. 3, 5 and 6 illustrate various embodiments of the portable apparatus.

FIG. 3 illustrates embodiments of the portable apparatus 102. The portable apparatus 102 comprises a memory 310 configured to store user profiles of a group whom the same portable apparatus 102 is assigned to. Each user profile specifies user-specific parameters relating to the user of the portable apparatus 102. Examples of such parameters include name, physiological parameters such as age, weight, height, gender, maximum performance capacity, activity parameter etc., and exercise-related parameters such as an energy expenditure parameter, an energy expenditure target, heart rate zones, activity zones, maximum heart rate, anaerobic threshold, time and day the user will be scheduled to be using the unit, class identifier (Period 1 of a school physical education PE class for example).

The portable apparatus 102 also comprises a processor 306 configured to perform a selection of a user profile from among the user profiles of the group stored in the memory 310 on the basis of a predetermined condition, and to modify an exercise data processing configuration of the portable apparatus 102 on the basis of the selected user profile.

The selection of the user profile and the modification of the exercise data processing configuration are automatic. The term 'automatic' refers to the fact that the processor 306 performs its tasks autonomously, self-acting, and/or without an external motive force. This is opposite to such an operation where the user has to select the user profile, and/or modify the exercise data processing configuration. Even if the embodiments operate automatically in this respect, it is not excluded that the user may perform a confirmation operation or operations. Consequently, the processor 306 may be configured to perform the selection automatically, without the user interacting with a user interface of the portable apparatus 102, or semi-automatically, the user accepting a user profile suggested in the user interface of the portable apparatus 102.

In an embodiment, the processor 306 is configured to modify as the exercise data processing configuration of the portable apparatus at least one of an activity calculation algorithm, an energy expenditure calculation algorithm, a motion detection based activity threshold, a fitness test algorithm, heart rate zone limits, mode of exercise data display. In effect, the user profile alters the way the portable apparatus 102 operates, in order to match the personal characteristics of the user better.

In an embodiment, the processor 306 is configured to calculate a parameter from an exercise performed by the user of the portable apparatus under the control of the modified exercise data processing configuration of the portable apparatus. The portable apparatus 102 may comprise an output device configured to output the parameter. The output device may be, for example, a part of the user interface 308 of the portable apparatus 102: the parameter may be outputted on a display of the portable apparatus 102, for example. The output device may also be an interface via which the parameter may be transferred to another device. Such an interface may be wired or wireless. Examples of such technologies include a communication bus, such as Universal Serial Bus USB, or some other serial/parallel bus, or a radio transceiver (such as Bluetooth or some other standard or proprietary communication protocol).

In an embodiment, the portable apparatus 102 comprises a clock configured to provide a clock time to the processor 306, and the processor 306 is configured to perform the selection utilizing the clock time as a part of the predetermined condition. The clock may be implemented with any suitable means to implement an electronic clock. There may be a separate clock circuit in the portable apparatus 102, for example. Another option is that the clock is software-based: electrical pulses coming from a system clock 514 (illustrated in FIG. 5, and also explained in connection with FIG. 5) may be calculated in order to measure the passage of time. The user profile may thus automatically change depending on the clock time.

In an embodiment the memory 310 is configured to store time of exercise for each user profile, and the processor 306 is configured to select the user profile whose time of exercise matches the clock time. The memory 310 may be configured to store as the time of the exercise at least one of starting time of the exercise, duration of the exercise, ending time of the exercise.

There may also be other ways to perform the selection of the user profile and the modification of the exercise data processing configuration in an automatic fashion. The processor 306 may be configured to utilize an external wireless interaction as a part of the predetermined condition. In such an embodiment, the portable apparatus 102 may comprise a proximity communication unit configured to wirelessly transfer information with a proximity communication counterpart unit, and the processor 306 may be configured to perform the selection utilizing the information as a part of the predetermined condition. The proximity communication unit may be configured to receive a user identification code from the proximity communication counterpart unit, and the memory 310 may be configured to store a unique user identification code for each user profile, and the processor 306 may be configured to select the user profile whose user identification code matches the received user identification code. The proximity communication counterpart unit may be a RFID tag carried by the user, or some other remotely readable device. Alternatively, the proximity communication counterpart unit may be a reader/writer which communicates with the communication unit 312 of the portable apparatus 102.

In an embodiment, as illustrated in FIG. 3, the portable apparatus 102 may comprise a receiver 312 configured to wirelessly receive 104 the user profiles of the group, which are then transferred 330 from the receiver 312 to the processor 306 and/or to the memory 310.

The term 'portable apparatus' 102 refers to an apparatus capable of processing data relating to an exercise performed by a user of the portable apparatus 102. The user may move the portable apparatus 102 around by carrying it. Examples of such portable apparatuses 102 include a mobile apparatus, a heart rate monitor, a multi-sports computer, a sports watch, and an activity monitor. The portable apparatus 300 may also be a part of such an apparatus set, such as a wrist unit, for example.

However, the embodiments are not limited to these examples, but the embodiments may be applied to any portable apparatus 102 used to process data relating to an exercise performed by the user of the portable apparatus 102. The term 'exercise' refers to sports, fitness exercise, and, in general, to any physical activity of the user.

The user interface part of the portable apparatus 102 may be worn around the wrist, like a watch, but it may well be implemented in another kind of platform, such as a subscriber terminal of a radio system: a mobile telephone for example. The user interface part may also be a sports watch for use as an instrument in sports. Polar Electro® (www.polarelectro.com) designs and manufactures such apparatuses 102 and their accessories. At the time of filing this patent application, the portable apparatus 102 may be implemented based on a Polar sports computer FT80, for example. The implementation of the embodiments in such an existing product requires relatively small and well-defined modifications. Naturally, as the products evolve, feasible platforms for the implementation of the embodiments described in this patent application also evolve and emerge.

The portable apparatus 102 may be a heart rate monitor for measuring the user's heart rate and possibly other physiological parameters that can be measured from the user. In U.S. Pat. No. 4,625,733, which is incorporated herein by reference, Säynäjäkangas describes a wireless heart rate monitoring concept where a transmitter attached to the user's chest measures the user's heart rate and transmits heart rate information telemetrically to a heart rate receiver attached to the user's wrist. The transmission of the heart activity data may utilize the principles of time division and/or packet transmission, for example.

Other implementations may also be possible. The heart rate monitor may also be implemented such that the heart rate is directly measured from the wrist on the basis of pressure or optical measurement, for example. Other ways for measuring the heart rate may also be employed. As sensor technology becomes more integrated, less expensive, and its power consumption characteristics are improved, a sensor measuring heart activity data may also be placed in arrangements other than the chest strap transmitter. Polar Electro is already marketing apparels which comprise integrated electrode structures.

Figure 6:
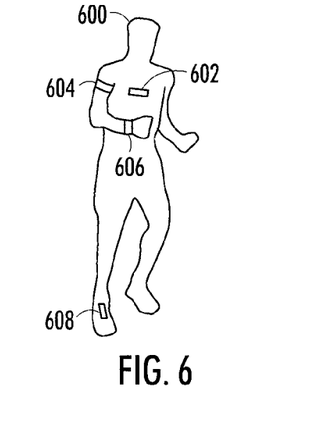

FIG. 6 illustrates an embodiment where the portable apparatus 102 is implemented as a running computer, such as Polar FT80. A runner 600 is provided with the following equipment: a wrist receiver 606, a heart rate transmitter 602, an upper-arm-mounted positioning receiver 604, and a shoe-mounted stride sensor 608. The accessories 602, 604, 608 communicate wirelessly with the wrist receiver 606. Various accessories may be flexibly used as needed, i.e. all of them are not necessarily needed all the time, or by all users, or in all use cases.

The positioning receiver 604 receives external location information. The positioning receiver 604 may be a receiver of a global navigation satellite system. Such a system may be the Global Positioning System (GPS), the Global Navigation Satellite System (GLONASS), the Galileo Positioning System (Galileo), the Beidou Navigation System, or the Indian Regional Navigational Satellite System (IRNSS), for example. The positioning receiver 206 determines its location (longitude, latitude, and altitude) using signals transmitted from satellites orbiting the earth. Besides global navigation satellites, the positioning receiver 604 may also determine its location by utilizing other known positioning techniques. It is well known that by receiving radio signals from several different base stations, a mobile phone may determine its location.

In summary, the portable apparatus 102 may be such that it comprises at least one measurement sensor 314, 318, which measures some aspect of the exercise. The measurement sensor may be an internal measurement sensor 318, which is physically coupled (by a wiring on a printed circuit board, for example) with the portable apparatus 102. The measurement sensor may also be a wireless external sensor 314. The wireless external sensor 314 may be coupled by electric and/or magnetic radiation 320 with a receiver (implemented by an integrated circuit, for example) 316 of the portable apparatus 102. The measurement sensor 314, 318 may provide raw measurement data 322, 324 without further processing to the portable apparatus 102, or the measurement sensor may process the raw data before providing it to the portable apparatus 102.

The portable apparatus 102 may also be based on an existing activity monitor such as Polar Electro's FA20 Activity Computer. The measurement sensor may be an accelerometer. The accelerometer measures its own motion, acceleration, i.e. the rate of change in velocity, and converts the acceleration into an electric signal. The electric signal is converted into a digital format in an AD converter. Acceleration can be expressed by the unit of measurement g. One g is the acceleration caused to an object by earth's gravity. Accelerations between −2 and +2 g can usually be measured from human movement. Various techniques may be used for measuring acceleration. Piezo-resistor technology employs material whose resistance changes as it compresses. The acceleration of mass produces a force in a piezo resistor. If a constant current is supplied through the piezo resistor, its voltage changes according to the compression caused by acceleration. In piezo-electric technology, a piezo-electric sensor generates charging when the sensor is accelerated. In silicon bridge technology, a silicon chip is etched so that a silicon mass remains on it at the end of a silicon beam. If acceleration is directed to the silicon chip, the silicon mass focuses a force on the silicon beam, thus changing the resistance of the silicon beam. Micro-machined silicon technology is based on the use of a differential capacitor. Voice coil technology is based on the same principle as a microphone. Examples of suitable movement sensors include: Analog Devices ADXL105, Pewatron HW or VTI Technologies SCA series. The implementation of the accelerometer may also be based on other appropriate techniques, for example on a gyroscope integrated into a silicon chip or on a micro vibration switch incorporated into a surface mounting component.

The portable apparatus 102 may comprise a user interface 308. The user interface 308 may comprise a display, means for producing sound, a keyboard, and/or a keypad. The display may be a liquid crystal display, for example, but it may also be implemented by any appropriate prior art technique. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (qwerty) keyboard, a mere numeric keypad or only a few push buttons and/or rotary buttons. In addition, the user interface 308 may comprise other prior art user interface elements, for example various means for focusing a cursor (mouse, track ball, various arrow keys, touch sensitive area etc.) or elements enabling audio control. A parameter relating to the exercise or a setting of the portable apparatus 102 may be shown on the user interface 308, on the display, for example.

Figure 5:
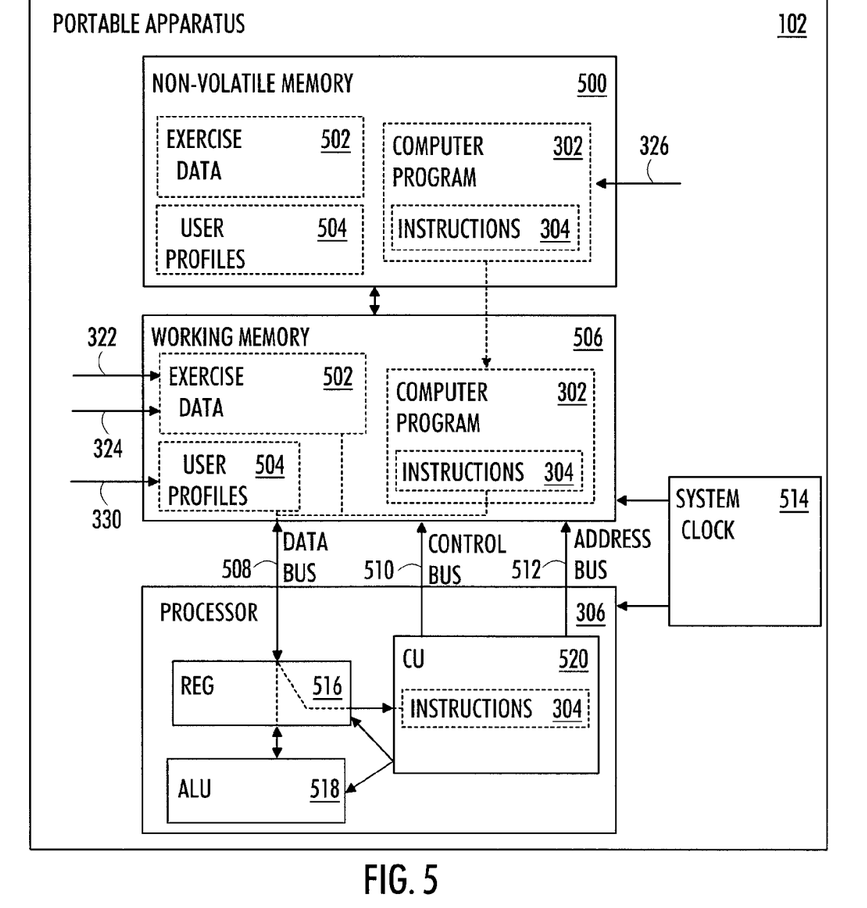

A part of the apparatus 102 may be an electronic digital computer, which may comprise, besides the processor 306, a working memory 506, and a system clock 514, as illustrated in FIG. 5. Furthermore, the computer may comprise a number of peripheral devices. In FIG. 5, one peripheral device is illustrated: a non-volatile memory 500. Naturally, the computer may comprise a number of other peripheral devices, not illustrated here for the sake of clarity.

The system clock 514 constantly generates a stream of electrical pulses, which cause the various transferring operations within the computer to take place in an orderly manner and with specific timing.

The term 'processor' refers to a device that is capable of processing data. The processor 306 may comprise an electronic circuit or electronic circuits implementing the required functionality, and/or a microprocessor or microprocessors running a computer program 302 implementing the required functionality. When designing the implementation, a person skilled in the art will consider the requirements set for the size and power consumption of the apparatus, the necessary processing capacity, production costs, and production volumes, for example. The electronic circuit may comprise logic components, standard integrated circuits, application-specific integrated circuits (ASIC), and/or other suitable electronic structures.

The microprocessor 306 implements functions of a central processing unit (CPU) on an integrated circuit. The CPU 306 is a logic machine executing a computer program 302, which comprises program instructions 304. The program instructions 304 may be coded as a computer program using a programming language, which may be a high-level programming language, such as C, or Java, or a low-level programming language, such as a machine language, or an assembler. The CPU 306 may comprise a set of registers 516, an arithmetic logic unit (ALU) 518, and a control unit (CU) 520. The control unit 520 is controlled by a sequence of program instructions 304 transferred to the CPU 306 from the working memory 506. The control unit 520 may contain a number of microinstructions for basic operations. The implementation of the microinstructions may vary, depending on the CPU 306 design. The microprocessor 306 may also have an operating system (a dedicated operating system of an embedded system, or a real-time operating system), which may provide the computer program 302 with system services.

There may be three different types of buses between the working memory 506 and the processor 306: a data bus 508, a control bus 510, and an address bus 512. The control unit 520 uses the control bus 510 to set the working memory 506 in two states, one for writing data into the working memory 506, and the other for reading data from the working memory 506. The control unit 520 uses the address bus 512 to send to the working memory 506 address signals for addressing specified portions of the memory in writing and reading states. The data bus 508 is used to transfer data, such as exercise data 502 and user profiles 504, from the working memory 506 to the processor 306 and from the processor 306 to the working memory 506, and to transfer the instructions 304 from the working memory 506 to the processor 306.

The working memory 506 may be implemented as a random-access memory (RAM), where the information is lost after the power is switched off. The RAM is capable of returning any piece of data in a constant time, regardless of its physical location and whether or not it is related to the previous piece of data. The data may comprise exercise data, user profiles, any temporary data needed during the processing, program instructions etc.

The non-volatile memory 500 retains the stored information even when not powered. Examples of non-volatile memory include read-only memory (ROM), flash memory, magnetic computer storage devices such as hard disk drives, and optical discs. As is shown in FIG. 5, the non-volatile memory 500 may store both data 502, 504 and a computer program 302 comprising program instructions 304.

An embodiment provides a computer program 302 comprising program instructions 304 which, when loaded into the portable apparatus 102, cause the portable apparatus 102 to store user profiles of a group, each user profile specifying user-specific parameters, to perform a selection of a user profile from among the user profiles of the group stored in the memory on the basis of a predetermined condition, and to modify an exercise data processing configuration of the portable apparatus on the basis of the selected user profile.

The computer program 302 may be in source code form, object code form, or in some intermediate form. The computer program 302 may be stored in a carrier 300, which may be any entity or device capable of carrying the program to the portable apparatus 102. The carrier 300 may be a computer-readable storage medium. Besides this, the carrier 300 may be implemented as follows, for example: the computer program 302 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 300 may not be the telecommunications signal.

FIGS. 3 and 5 illustrate that the carrier 300 may be coupled 326 with the portable apparatus 102, whereupon the program 302 comprising the program instructions 304 is transferred into the working memory 506, and possibly also into the non-volatile memory 500. The program 302 with its program instructions 304 may be loaded from the non-volatile memory 500 into the working memory 506 as needed. During running of the program 302, the program instructions 304 are transferred via the data bus 508 from the working memory 506 into the control unit 520, wherein usually a portion of the instructions 304 resides and controls the operation of the portable apparatus 102.

There are many ways to structure the program 302. The operations of the program may be divided into functional modules, sub-routines, methods, classes, objects, applets, macros, etc., depending on the software design methodology and the programming language used. In modern programming environments, there are software libraries, i.e. compilations of ready made functions, which may be utilized by the program for performing a wide variety of standard operations.

As was already explained with reference to FIG. 1, the portable apparatuses 102 may be used by a group of people, by a group of students, for example. Each single apparatus 102 A-Y may be used by several students, each student belonging to a different group. For each single apparatus 102 A-Y, the user profiles of those students who will use it, have to be downloaded 104. The download 104 may be performed by the management apparatus 100.

Figure 2:
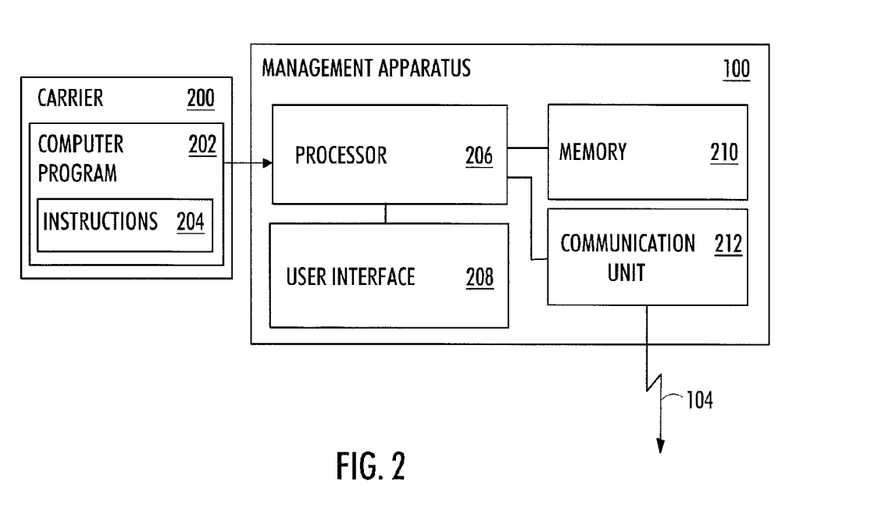
FIG. 2 illustrates an embodiment of the management apparatus.

The management apparatus 100 is illustrated in FIG. 2: it comprises a user interface 208 configured to define user profiles of a group, each user profile specifying user-specific parameters, and a transmitter 212 configured to wirelessly transmit 104 the user profiles of the group to the portable apparatuses 102 A-Y. Furthermore, the management apparatus 100 may comprise a memory 210 configured to store the user profiles. The management apparatus 100 may be an electronic digital computer, like the one illustrated in FIG. 5. Correspondingly, the functionality of the management apparatus 100 may be provided by a computer program 202, possibly stored on a carrier 200, comprising program instructions 204 which, when loaded into the management apparatus 100, cause the management apparatus 100 to perform the appropriate operations.

Depending on the processing power needed, the management apparatus computer 100 may comprise several (parallel) processors 206, or the required processing may be distributed amongst a number of computers 100. The computer 100 may be a laptop computer, a personal computer, a server computer, a mainframe computer, or any other suitable computer. As the processing power of portable communications terminals, such as mobile phones, is constantly increasing, the management apparatus 100 functionality may be implemented into them as well. The management apparatus 100 may be a PDA (Personal Digital Assistant) as well.

The communication 104, unidirectional or bidirectional, between the management apparatus 100 and the portable apparatuses 102 A-Y may be implemented with a suitable communication technology.

One such technology is proximity communication, which refers to a communication technology that takes place over relatively small distances. A suitable range may vary from 0.1 to 2.0 meters, for example. The proximity communication may be implemented with an induction-based technology utilizing a magnetic field, or a radio-based technology utilizing electric radiation, for example. It is to be noted that both technologies involve both the magnetic field and the electric radiation, but the separation is based on the fact that either one of these physical phenomena predominates and is only used for communication in each technology. The induction-based transmission may operate at a kilohertz range frequency (5 kilohertz, 125 kilohertz, or over 200 kilohertz, for example). The radio transmission may utilize a proprietary transceiver (operating at a 2.4 gigahertz frequency, for example), or a Bluetooth transceiver, for example. Emerging ultra low power Bluetooth technology may also be used. Other suitable proximity communication techniques may include techniques based on light or sound, such as infrared communication or sonic communication. The proximity communication may utilize any suitable protocols: the principles of time division and/or packet transmission, for example.

The communication unit 212, 312 may be an induction-based transmitter and/or receiver, such as a kilohertz-range transmitter/receiver, a passive radio-frequency identification tag/tag reader, a coil-based inductive communication unit, or a near field communication transmitter/receiver, for example. The kilohertz-range transmission may operate at a 5-kilohertz frequency, for example. Higher frequencies, such as those exceeding 200 kilohertz, may also be possible. In an embodiment, the kilohertz-range includes 125 kilohertz. Near field communication may refer to a short-range high frequency wireless communication technology, also known as NFC, which enables communication over about a 10-centimeter distance. The proximity communication unit may also be a radio transmitter and/or receiver, such as a proprietary transmitter/receiver, or a Bluetooth transmitter/receiver, for example. Emerging ultra low power Bluetooth technology may be used. The proprietary radio transmission may operate at a 2.4-gigahertz frequency, for example. The radio transmission may also operate according to some WLAN (Wireless Local Area Network) standard.

Now that the basic components are adequately described, a complex usage scenario may be presented, in order to illustrate one way of using the embodiments. A teacher uses the portable apparatuses 102 for several classes of students.

Depending on the set up on the web, the wrist unit 606 features may be either active/visible or not. If the teacher decides to use generic heart rate limits for the whole group, any wrist unit 606 can be used by any student. However, if the teacher decides to setup in each wrist unit 606 ten different user profiles, each student has to use the wrist unit 606 assigned to him/her.

The data displayed on the wrist unit 606 may include some of the following, for example: heart rate, duration of exercise/in-zone countdown timer to target, zone view (current zone indicator, time in zone), calories, user identifier or name, time & date, and speed, distance, and/or altitude related data.

When the wrist unit 606 goes to sleep mode, depending on the setting either monitor identifier, user identifier or student name is clearly visible on display, so that the student may take the correct wrist unit 606 containing his/her user profile.

The teacher may start up by registering on a web service through a quick-start wizard. Ideally, data transfer software (previously known as WebSync product of Polar Electro) is embedded into the web service or in the WindLink (a Polar Electro product) so there is no need to download it separately.

After the registration wizard, the teacher is given guidance on how to start planning her lessons for the coming semester/year.

She may enter/import her courses and student lists with student identifiers, and divide them into classes/groups and drag them into a calendar. She may either select a lesson from the lesson library or create her own. She may also select ready made rubrics for her lesson plan or create her own. She is also able to create a grading scheme at any time. Older students may register to the web service with their school identifier and create their own account as part of lesson plan.

There may be two ways to set up the wrist units 606:

A) With individual profiles:

One wrist unit may hold max eight different student profiles (+"new user"—profile) at most.

A student profile contains data such as: user identifier/student name, age, height, weight, heart rate zone and others listed previously.

B) With group profiles:

Teacher may also decide to use same profile for the whole class/year and for that the web service offers an option to "use same settings for whole group".

Teacher may set up the wrist units once a week (or even once in a semester if the same students always use the same wrist units).

As teacher may assign each wrist unit for up to eight students, WebSync allows more than one user identifier to be transferred to the same wrist unit.

As soon as the teacher clicks the synchronize button, WebSync pops up and provided the wrist units are in a "receiving mode" the data is transferred automatically via WindLink to the wrist units.

Throughout the transfer, WebSync indicates graphically to the teacher which wrist unit is being set up and when the set up is complete.

The speed of data transfer is very fast, ten times faster compared to the old IrDA (The Infrared Data Association) transfer.

When teacher sends user settings first time to the wrist units, it takes max 1.5 seconds per user identifier. If eight different user identifiers are sent to one monitor, it takes 8×1.5 s=12 seconds per wrist unit. Minimum of five wrist units may be set up simultaneously, this means if teacher wants to set up 25 monitors with eight user identifiers per monitor in one hit, it will take: 12 s×25 monitors=>five minutes for all.

Teacher is aware that if she uses one wrist unit for five one-hour classes per day, five days a week, she will have to change the battery for the wrist unit twice a year. She also understands that by saving power where possible, she may make the batteries last a bit longer. It is therefore acceptable that the wrist unit displays, when not in use, will be turned off automatically. When taken into use, either teacher may activate the wrist units (especially if she wants to transfer data before class) or the students may do it at the beginning of class.

The wrist units may either sniff for in-coming WIND signal automatically at certain intervals or they may be programmed from the web by the teacher the exact time periods they should start detecting and/or sending WIND signal (every morning 8-9 am and again every afternoon 3-4 pm, or for 15 minutes from lost HR signal (transmitter taken off at the end of class), for example).

Once the teacher is ready to go to the class, she takes the Class Management Case where she has packed the connectors (if heart rate monitor feature is in use), wrist units and the optional PDA.

If teacher wants to use individual settings for one class middle of the day and otherwise generic settings, she may download new settings from the web between classes.

If heart rate monitor feature is in use, each student brings along their own WearLink strap and before going into the dressing room, they pick up one connector from the Management case.

In the dressing room, they wet the clearly marked/coloured electrodes under the tap, attach the connectors without adult assistance and put the WearLinks on.

With either heart rate monitor feature or activity monitor in use, as they come out of the dressing room, each student picks up a wrist unit which are placed in the holder with the monitor identifier clearly visible. So, if individual profiles have been set up, they may easily see which wrist unit to pick. Alternatively, if generic settings are in use, any student may pick any of the wrist units.

Each student, even as young as seven, is able to put on the wrist unit effortlessly and quickly and without adult assistance.

As the lesson starts, the teacher instructs the students to press the GREEN button on the wrist unit.

Students may easily see from the display if everything is ok. If not, data on display instructs what to do.

The teacher then instructs students to press the GREEN button again to start the exercise recording. Students have no problem pressing the green button and the response they get from the display clearly indicates whether recording has started or not. If heart rate is not received, first the wrist unit beeps and requests to check transmitter but if no signal is received after a short period, it returns to sleep mode to save battery. Student may easily wake the display up by pressing the green button again and check that his/her name is displayed.

Figure 4:
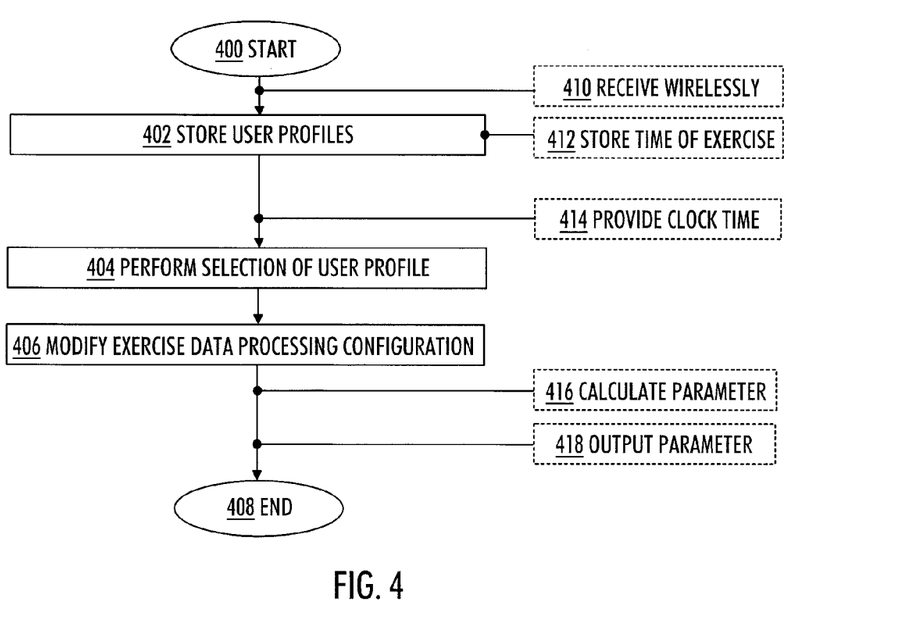
FIG. 4 illustrates various embodiments of a method.

Next, a method will be described with reference to FIG. 4. Other functions, not described in this application, may also be executed between the operations or within the operations. Some of the operations or parts of the operations may also be left out or replaced by a corresponding operation or part of the operation. The method starts in 400. In 402, user profiles of a group are stored in a portable apparatus, each user profile specifying user-specific parameters. In 404, a selection of a user profile is performed from among the user profiles of the group stored in the portable apparatus on the basis of a predetermined condition. In 406, an exercise data processing configuration of the portable apparatus is modified on the basis of the selected user profile. The method ends in 408. The embodiments of the portable apparatus 102 and the management apparatus 100 may also be used to enhance the method. In an embodiment, a computer program comprising program instructions which, when loaded into a portable apparatus, cause the apparatus to perform the described process. In an embodiment, a computer-readable storage medium comprises the computer program.

Next, seven embodiments of the method will be described. These embodiments may be freely combined with each other in order to produce further embodiments.

In an embodiment, the method further comprises: performing 404 the selection automatically, without the user interacting with a user interface of the portable apparatus, or semi-automatically, the user accepting a user profile suggested in the user interface of the portable apparatus.

In an embodiment, the method further comprises: providing 414 a clock time to the portable apparatus, and performing 404 the selection utilizing the clock time as a part of the predetermined condition.

In an embodiment, the method further comprises: storing 412 time of exercise for each user profile, and selecting 404 the user profile whose time of exercise matches the clock time.

In an embodiment, the method further comprises: storing 412 as the time of the exercise at least one of starting time of the exercise, duration of the exercise, ending time of the exercise.

In an embodiment, the method further comprises: receiving 410 wirelessly the user profiles of the group.

In an embodiment, the method further comprises: modifying 406 as the exercise data processing configuration of the portable apparatus at least one of an activity calculation algorithm, an energy expenditure calculation algorithm, a motion detection based activity threshold, a fitness test algorithm, heart rate zone limits, mode of exercise data display.

In an embodiment, the method further comprises: calculating 416 a parameter from an exercise performed by the user of the portable apparatus under the control of the modified exercise data processing configuration of the portable apparatus, and outputting 418 the parameter.

It will be obvious to a person skilled in the art that, as technology advances, the inventive concept can be implemented in various ways. The invention and its embodiments are not limited to the examples described above but may vary within the scope of the claims.

What is claimed is:

1. A portable apparatus comprising:
   a memory configured to store user profiles of a group, each user profile specifying user-specific parameters including a time of exercise;
   a processor configured to perform a selection of a user profile from among the user profiles of the group stored in the memory on the basis of a predetermined condition, and to modify an exercise data processing configuration of the portable apparatus on the basis of the selected user profile;
   the processor being further configured to perform the selection automatically without the user interacting with a user interface of the portable apparatus, or semi-automatically by the user accepting a user profile suggested in the user interface of the portable apparatus; and
   a clock configured to provide a clock time to the processor, the processor being further configured to perform the selection utilizing the clock time as a part of the predetermined condition, the clock time representing a time of day, thereby enabling automatic selection of the user profile from among the user profiles of the group stored in the memory whose time of exercise matches the clock time.

2. The apparatus of claim 1, wherein the memory is further configured to store time of exercise for each user profile, and the processor is further configured to select the user profile whose time of exercise matches the clock time.

3. The apparatus of claim 2, wherein the memory is further configured to store as the time of the exercise at least one of starting time of the exercise, duration of the exercise, ending time of the exercise.

4. The apparatus of claim 1, further comprising a receiver configured to wirelessly receive the user profiles of the group.

5. The apparatus of claim 1, wherein the processor is further configured to modify as the exercise data processing configuration of the portable apparatus at least one of an activity calculation algorithm, an energy expenditure calculation algorithm, a motion detection based activity threshold, a fitness test algorithm, heart rate zone limits, mode of exercise data display.

6. The apparatus of claim 1, wherein the processor is further configured to calculate a parameter from an exercise performed by the user of the portable apparatus under the control of the modified exercise data processing configuration of the portable apparatus, and the portable apparatus further comprises an output device configured to output the parameter.

7. A method comprising:
   storing user profiles of a group in a portable apparatus, each user profile specifying user-specific parameters including a time of exercise;
   performing a selection of a user profile from among the user profiles of the group stored in the portable apparatus on the basis of a predetermined condition;
   modifying an exercise data processing configuration of the portable apparatus on the basis of the selected user profile;
   performing the selection automatically without the user interacting with a user interface of the portable apparatus, or semi-automatically by the user accepting a user profile suggested in the user interface of the portable apparatus;
   providing a clock time to the portable apparatus; and
   performing the selection utilizing the clock time as a part of the predetermined condition, the clock time representing a time of day, thereby enabling automatic selection of the user profile from among the user profiles of the group stored in the memory whose time of exercise matches the clock time.

8. The method of claim 7, further comprising:
   storing time of exercise for each user profile; and selecting the user profile whose time of exercise matches the clock time.

9. The method of claim 8, further comprising:
storing as the time of the exercise at least one of starting time of the exercise, duration of the exercise, ending time of the exercise.

10. The method of claim 7, further comprising:
receiving wirelessly the user profiles of the group.

11. The method of claim 7, further comprising:
modifying as the exercise data processing configuration of the portable apparatus at least one of an activity calculation algorithm, an energy expenditure calculation algorithm, a motion detection based activity threshold, a fitness test algorithm, heart rate zone limits, mode of exercise data display.

12. The method of claim 7, further comprising:
calculating a parameter from an exercise performed by the user of the portable apparatus under the control of the modified exercise data processing configuration of the portable apparatus; and
outputting the parameter.

13. A non-transitory computer-readable storage medium comprising encoded instruction that, when executed by a computing device, cause the computing device to:
store user profiles of a group in a portable apparatus, each user profile specifying user-specific parameters including a time of exercise;
perform a selection of a user profile from among the user profiles of the group stored in the portable apparatus on the basis of a predetermined condition;
modify an exercise data processing configuration of the portable apparatus on the basis of the selected user profile;
performing the selection automatically without the user interacting with a user interface of the portable apparatus, or semi-automatically by the user accepting a user profile suggested in the user interface of the portable apparatus;
providing a clock time to the portable apparatus; and
performing the selection utilizing the clock time as a part of the predetermined condition, the clock time representing a time of day, thereby enabling automatic selection of the user profile from among the user profiles of the group stored in the memory whose time of exercise matches the clock time.

14. A portable apparatus comprising:
means for storing user profiles of a group, each user profile specifying user-specific parameters including a time of exercise;
means for performing a selection of a user profile from among the user profiles of the group stored in the means for storing on the basis of a predetermined condition;
means for modifying an exercise data processing configuration of the portable apparatus on the basis of the selected user profile;
means for performing the selection automatically without the user interacting with a user interface of the portable apparatus, or semi-automatically by the user accepting a user profile suggested in the user interface of the portable apparatus;
means for providing a clock time to the portable apparatus; and
means for performing the selection utilizing the clock time as a part of the predetermined condition, the clock time representing a time of day, thereby enabling automatic selection of the user profile from among the user profiles of the group stored in the memory whose time of exercise matches the clock time.

15. A management apparatus for portable apparatuses, comprising:
a user interface configured to define user profiles of a group, each user profile specifying user-specific parameters including a time of exercise;
a transmitter configured to wirelessly transmit the user profiles of the group to the portable apparatuses;
a memory configured to store user profiles of a group, each user profile specifying user-specific parameters;
a processor configured to perform a selection of a user profile from among the user profiles of the group stored in the memory on the basis of a predetermined condition, and to modify an exercise data processing configuration of the portable apparatus on the basis of the selected user profile;
the processor being further configured to perform the selection automatically without the user interacting with a user interface of the portable apparatus, or semi-automatically by the user accepting a user profile suggested in the user interface of the portable apparatus; and
a clock configured to provide a clock time to the processor, the processor being further configured to perform the selection utilizing the clock time as a part of the predetermined condition, the clock time representing a time of day, thereby enabling automatic selection of the user profile from among the user profiles of the group stored in the memory whose time of exercise matches the clock time.

16. The non-transitory computer-readable storage medium of claim 13, further comprising encoded instructions that, when executed by a computing device, cause the computing device to:
store time of exercise for each user profile; and
select the user profile whose time of exercise matches the clock time.

17. The non-transitory computer-readable storage medium of claim 16, further comprising encoded instructions that, when executed by a computing device, cause the computing device to store as the time of the exercise at least one of starting time of the exercise, duration of the exercise, ending time of the exercise.

18. The non-transitory computer-readable storage medium of claim 13, further comprising encoded instructions that, when executed by a computing device, cause the computing device to receive wirelessly the user profiles of the group.

19. The non-transitory computer-readable storage medium of claim 13, further comprising encoded instructions that, when executed by a computing device, cause the computing device to modify as the exercise data processing configuration of the portable apparatus at least one of an activity calculation algorithm, an energy expenditure calculation algorithm, a motion detection based activity threshold, a fitness test algorithm, heart rate zone limits, mode of exercise data display.

20. The non-transitory computer-readable storage medium of claim 13, further comprising encoded instructions that, when executed by a computing device, cause the computing device to:
calculate a parameter from an exercise performed by the user of the portable apparatus under the control of the modified exercise data processing configuration of the portable apparatus; and
output the parameter.

* * * * *